United States Patent
Braun et al.

(10) Patent No.: US 9,848,254 B2
(45) Date of Patent: Dec. 19, 2017

(54) EFFICIENT TRANSPORT NETWORK ARCHITECTURE FOR CONTENT DELIVERY NETWORK

(71) Applicant: Deutsche Telekom AG, Bonn (DE)

(72) Inventors: Ralf-Peter Braun, Berlin (DE); Michael Dueser, Berlin (DE); Thomas Monath, Schoenberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 190 days.

(21) Appl. No.: 14/746,949

(22) Filed: Jun. 23, 2015

(65) Prior Publication Data
US 2015/0382088 A1    Dec. 31, 2015

(30) Foreign Application Priority Data
Jun. 30, 2014   (EP) .................................. 14175000

(51) Int. Cl.
*H04J 14/00* (2006.01)
*H04Q 11/00* (2006.01)
(Continued)

(52) U.S. Cl.
CPC ...... *H04Q 11/0062* (2013.01); *H04J 14/0278* (2013.01); *H04L 67/1095* (2013.01);
(Continued)

(58) Field of Classification Search
CPC .... H04J 14/02; H04J 14/0221; H04J 14/0227; H04J 14/0201; H04Q 11/0066; H04Q 11/0062; H04L 47/12

USPC ........ 398/45, 48, 49, 79, 83, 57, 58, 85, 63, 398/60, 61, 66, 67, 68, 69, 70, 71, 72, 98, 398/99, 100, 59; 370/216, 217, 222, 225, 370/228, 235, 254
See application file for complete search history.

(56) References Cited

U.S. PATENT DOCUMENTS

| 2005/0207756 A1* | 9/2005 | Tanaka ................... H04J 14/02 398/85 |
| 2010/0238924 A1 | 9/2010 | Liu |

(Continued)

FOREIGN PATENT DOCUMENTS

| EP | 2073501 A1 | 6/2009 |
| WO | WO 0155855 A1 | 8/2001 |

(Continued)

OTHER PUBLICATIONS

Csaba Kiss Kallo et al: "Benefits of optical packet switching for router by-pass in metro networks", Future Network&Mobile Summit (FUTURENETW), 2012, IEEE, Jul. 4, 2012 (Jul. 4, 2012), pp. 1-8, XP032231989.

(Continued)

*Primary Examiner* — Hanh Phan
(74) *Attorney, Agent, or Firm* — Leydig, Voit & Mayer, Ltd.

(57) ABSTRACT

A content delivery network (CDN) includes: at least one CDN origin node; and multiple CDN cache nodes connected to the at least one CDN origin node via an optical transport network (OTN). Deliveries and/or routing from the multiple CDN cache nodes to the at least one CDN origin node and/or vice versa is performed below layer 3 of the Open Systems Interconnection (OSI) model.

16 Claims, 11 Drawing Sheets

(51) Int. Cl.
*H04L 29/08* (2006.01)
*H04J 14/02* (2006.01)
*H04N 21/61* (2011.01)
*H04L 12/721* (2013.01)

(52) U.S. Cl.
CPC ........ *H04L 67/2842* (2013.01); *H04L 69/324* (2013.01); *H04N 21/61* (2013.01); *H04N 21/6125* (2013.01); *H04N 21/6175* (2013.01); *H04L 45/62* (2013.01); *H04Q 2011/0094* (2013.01); *H04Q 2011/0098* (2013.01)

(56) References Cited

U.S. PATENT DOCUMENTS

| | | | |
|---|---|---|---|
| 2014/0143409 A1 | 5/2014 | Ali et al. | |
| 2014/0161449 A1* | 6/2014 | Doerr | H04J 14/0257 398/49 |
| 2015/0016821 A1* | 1/2015 | Li | H04B 10/25751 398/66 |
| 2015/0117860 A1 | 4/2015 | Braun | |

FOREIGN PATENT DOCUMENTS

| | | |
|---|---|---|
| WO | WO 0176192 A2 | 10/2001 |
| WO | WO 2013044987 A1 | 4/2013 |
| WO | WO 2013164044 A1 | 11/2013 |

OTHER PUBLICATIONS

Juan P Fernandez-Palacios et al: "IP offloading over multi-granular photonic switching technologies", 36$^{TH}$ European Conference and Exhibition on Optical Communication: (ECOC 2010); Torino, Italy, Sep. 19-23, 2010, IEEE, Piscataway, NJ, USA, Sep. 19, 2010 (Sep. 19, 2010), pp. 1-3, XP031789872.

Adel A M Saleh et al: "AIII-Optical Networking Evolution, Benefits, Challenges, and Future Vision", Proceedings of the IEEE, IEEE. New York, US, vol. 100, No. 5, May 1, 2012 (May 1, 2012), pp. 1105-1117, XP011441697.

Erik Nygren, et al., "The Akamai Network: A Platform for High-Performance Internet Applications", ACM SIGOPS Operating Systems Review, vol. 44, No. 3, Jul. 2010, pp. 1-18.

Benjamin Frank, et al., "Pushing CDN-ISP Collaboration to the Limit", ACM SIGCOMM Computer Communication Review, vol. 43, No. 3, Jul. 2013, pp. 35-44.

"Cisco Visual Networking Index: Forecast and Methodology, 2012-2017", Cisco Systems, Inc., May 29, 2013, pp. 1-15.

"Screaming fast infrastructure", http://www.streamzillacdn.com/streamzilla-network/, Jun. 11, 2013, pp. 1-2.

"Sandvine's Spring 2011 Global Internet Phenomena Report Reveals New Internet Trends", http://www.sandvine.com/, May 17, 2011, pp. 2-4.

Ralf-Peter Braun, et al., Cost Effective Scalable Optical Networks—Transparent Optically Routed Network (TOR-NET), Conference: Photonic Networks—13. ITG-Symposium, May 7-8, 2012, pp. 1-3.

"Cisco ONS 15454 10-Port 10 Gbps Line Card", http://www.cisco.com/c/en/us/products/collateral/optical-networking/ons-15454-series-multiservice-provisioning-platforms/data_sheet_c78-713296.html, May, 2014, pp. 1-14.

Shinobu Nomatsu, "40 Gbps/100 Gbps Large-Capacity Optical Transmission Equipment", Mitsubishi Electric Advance, Sep. 2012, pp. 2-5.

ITU-T: Telecommunications Standardization sector of ITU G.694.1, "Series G: Transmission systems and media, digital systems and networks: Transmission media and optical systems characteristics—Characteristics of optical systems", Spectral grids for WDM applications: DWDM frequency grid, Feb. 2012, pp. 1-16.

Submarine Cable Networks, "40Gbps Transmission over TGN Pacific", http://www.submarinenetworks.com/systems/trans-pacific/40gbps-transmission-over-tgn, Jul. 13, 2013, p. 1.

* cited by examiner

EFFICIENT TRANSPORT NETWORK ARCHITECTURE FOR CONTENT DELIVERY NETWORK

CROSS-REFERENCE TO RELATED APPLICATIONS

Priority is claimed to European Patent Application No. EP 14 17 5000.0, filed on Jun. 30, 2014, the entire disclosure of which is hereby incorporated by reference herein.

FIELD

The present invention relates to a system and a method for an efficient distribution and/or synchronization of content delivery network (CDN) data capacities via a passive transparent optically routed transport network architecture.

BACKGROUND

A content delivery network (CDN), also referred to as content distribution network, is a network of distributed servers connected via IP connections, by means of which contents, in particular large media files, are delivered. CDN nodes are normally distributed to many locations and often also to many backbones. They work together for handling requests of end users, depending on the content, as comprehensively and economically as possible. In the background, the data are cached such in the network that the respective delivery is either as fast as possible (performance optimization) or needs as little bandwidth as possible (cost optimization), or both at the same time. Large CDNs keep thousands of nodes with ten thousands of servers. In principle, there are at least two kinds of CDN nodes which are defined by their functionality (content, ... ): the CDN origin and the CDN cache. According to the prior art, the CDN origin is in a star point of the CDN network (root, hub). The CDN cache is in the area of the network (leaf, spoke), i.e. there is a root-leaf (hub & spoke) structure.

Today's Internet traffic is dominated by few large CDNs (Akamai, Limelight, Google) which distribute the content of few large providers world-wide. Moreover, large providers such as Youtube and Google also have own CDNs. For example, Netflix generates about 30% of the data traffic in North America during main traffic times. For this purpose, Netflix uses multiple CDN providers. Therefore, high-bit-rate, highly scalable and at the same time very cost efficient transport solutions for CDN are necessary, which do not exist today. More than 10% of the overall data rate of the Internet comes from Google and, according to Akamai, about 30% of the overall rate of the Internet web data are transported by Akamai. Thus, the concentration of contents increases to few CDNs. Moreover, the trend for providers of contents goes to multi CDN, i.e. the own contents are offered in parallel via multiple CDN providers.

When delivering large data capacities of content delivery network (CDN) services, the presently used delivery networks reach their limits because they are not designed for the delivery of directed high-capacity data streams which block the network, but for the decentralized delivery of many arbitrarily incoming delivery inquiries of different data capacities.

In CDN applications, very high data capacities are delivered between known locations, on the one hand for the inquiring data service and on the other hand for synchronization purposes. If these data streams are handled via conventional public networks, these high-capacity data streams block other data streams in the network between specific network points. Alternatively, the disproportionately increasing demands on DCN traffic require considerable investment in the existing IP-WDM transport network infrastructure (WDM: wavelength division multiplexing).

The only presently available scalable solution for delivering duplicates is the multicast protocol in IP. At present, there are many attempts for making the multicast protocol operable also for IPv6, in particular for the delivery of life TV (also "real-time TV" or "linear TV"). Thus, there is a need for distributing large data volumes, preferably video data.

An essential feature of CDN traffic is its high temporal and spatial dynamic. Because of very short-term optimization intervals, feed-in location and feed-in volume chance at a high frequency. IP transport networks optimize the available capacities, e.g., by means of link weights, with clearly lower frequency, often only once a day. A prerequisite for the optimization of capacities in IP transport networks are so-called "traffic matrices" by means of which the capacity requirements or capacity demands between sources and sinks in the network are determined unidirectionally and unambiguously. For the high-frequency configuration of CDNs, the concept of a quasi static traffic matrix is unsuitable; it might bring IP transport networks into an instable state by misconfiguration of the link weights.

An additional requirement of future networks is the delivery of "multipoint-to-point", i.e. contents for a customer are supplied from spatially or logically distributed sources simultaneously/synchronously. Exemplary applications are the fixed network, mobile networks, hybrid networks or wireless networks.

Current predictions as to the data traffic to be expected in the future point to a traffic which is further growing exponentially and which is feed disproportionally by CDNs.

CDN applications make increased demands on the traffic to transport networks in view of latency, capacity, throughput and data loss. Especially the video distribution has particular demands in view of latency and bandwidth. The delivery via today's Internet (best effort) does not offer any delivery reliability. Typically, a high-bit-rate real-time delivery is possible only via short distances. The below Table 1, taken from reference [1], clarifies the relation between delivery distance (distance (server to user) in miles) and delivery time (network RTT, round trip time; 4 GB DVD download time), packet loss (typical packet loss) and data throughput (throughput).

TABLE 1

Relation between distance, throughput and download time in a CDN network (see [1])

| Distance (Server to User) | Network RTT | Typical Packet Loss | Throughput | 4 GB DVD Download Time |
|---|---|---|---|---|
| Local: <100 mi. | 1.6 ms | 0.6% | 44 Mbps (high quality HDTV) | 12 min. |
| Regional: 500-1,000 mi. | 16 ms | 0.7% | 4 Mbps (basic HDTV) | 2.2 hrs. |
| Cross-continent: ~3,000 mi. | 48 ms | 1.0% | 1 Mbps (SD TV) | 8.2 hrs. |
| Multi-continent: ~6,000 mi. | 96 ms | 1.4% | 0.4 Mbps (poor) | 20 hrs |

SUMMARY

In an embodiment, the present invention provides a content delivery network (CDN). The CDN includes: at least one CDN origin node; and multiple CDN cache nodes connected to the at least one CDN origin node via an optical transport network (OTN). Deliveries and/or routing from the multiple CDN cache nodes to the at least one CDN origin node and/or vice versa is performed below layer 3 of the Open Systems Interconnection (OSI) model.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
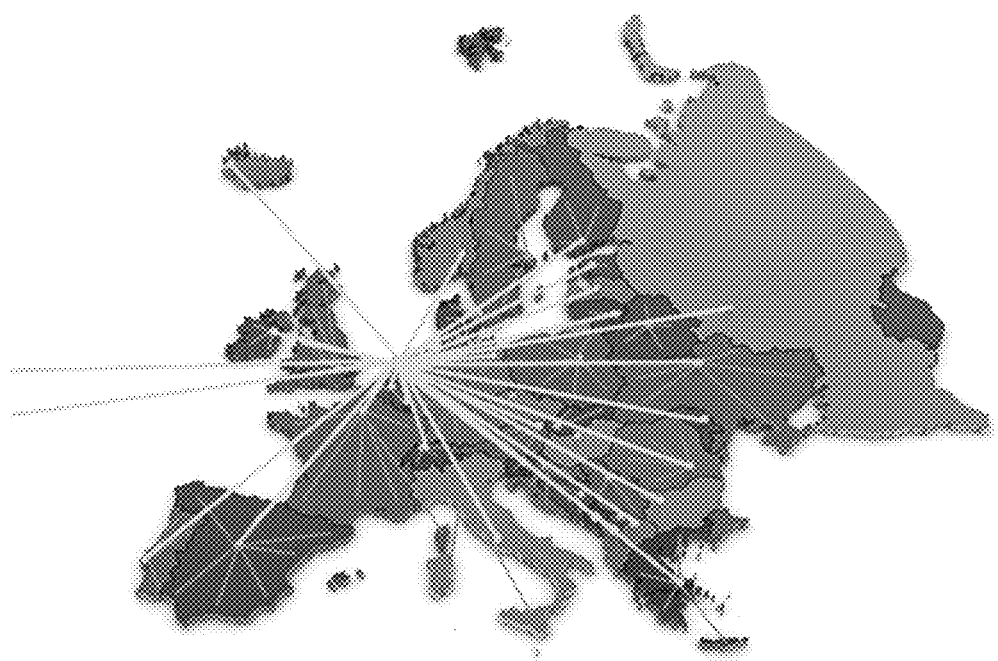
FIG. 1 shows a conventional CDN "star" architecture in Europe.

Future network architectures aim at an application-agnostic design. Reasons for this are, e.g., inefficient transmission protocols such as the TCP (transmission control protocol), which additionally reduces the delivery capacity in case of packet losses on the IP layer (layer 3 of the OSI model) by inquiring the lost packets.

By the new CDN network structure according to the invention, a hub & spoke structure can be achieved because of a new possible network meshing which has not been possible before in this manner. Moreover, a CDN network structure can be expanded in accordance with the present invention, if desired. In the following, the terms CDN origin and CDN origin node are used synonymously. Accordingly, also the terms CDN cache and CDN cache node should be understood synonymously.

The present invention relates to a content delivery network (CDN) having at least one CDN origin node and multiple CDN cache nodes which are connected to the CDN origin node via an optical transport network, OTN. The present invention is i.a. characterized in that the delivery and/or the routing from a CDN cache node to a CDN origin node and/or vice versa takes place below layer 3 of the OSI model.

Preferably, the optical transport network is a passive transparent optically routed transport network, preferably an OTN according to the ITU-T standard G.709, so that a direct transparent optical connection from a CDN cache node to a CDN origin node and vice versa is possible. Additionally or alternatively it is moreover preferred that a direct transparent optical connection from a CDN cache node to another CDN cache node and vice versa is possible.

According to a preferred embodiment, the CDN cache nodes are connected to the at least one CDN origin node via a star topology. The connection is preferably achieved via a meshed star topology, more preferably via a fully meshed star topology.

Preferably, the delivery of data or the routing from CDN cache nodes to the CDN origin node and vice versa is performed without an IP overlay network.

Preferably, data are then delivered from a CDN origin to a first node via an N×N AWG to a second node at a CDN cache. The delivery of N×N AWGs to the second node is then preferably performed via an OTN. The components CDN origin, first node, N×N AWG, OTN, second node and (first) CDN cache are preferably components of a first network level.

Moreover, there can also be a delivery further into a second network level, i.e. from the second node via an M×M AGW to a user node (in short: node) and then to a (second) CDN cache. Preferably, M is unequal to N, preferably M<N.

Preferably, the OTN shows a first CDN network level from the CDN origin node to the multiple CDN cache nodes, and optical routing takes place by means of N×N AWGs, and full meshing preferably takes place by DWDM, dense wavelength division multiplex, channels.

Preferably, also a second CDN network level from CDN cache nodes to CDN cache nodes can be defined with further passive optical M×M AWG elements, so that also in the second CDN network level a wavelength-addressed full meshing for transparent optical connections between the CDN origin and CDN cache nodes becomes possible, preferably for the following N, M combinations: [3,32]; [4,24]; [6,16]; [8,12]; [12,8]; [16,6]; [24,4] und [32,3].

Preferably, the CDN is connected to a further CDN via an optical transport network so that interconnection traffics between the two CDNs below layer 3 of the OSI model can be routed preferably directly, passively and optically transparently, preferably bidirectionally.

Moreover, it is preferred that the interconnection traffics take place between the CDN origin nodes of the two CDN networks and/or between different CDN origin and CDN cache nodes.

According to a further preferred embodiment, different CDN services such as CDN content traffics, CDN synchronization traffics and CDN interconnection traffics can be delivered and/or routed by means of different wavelength-addressed optical channels separately and independently of one another.

The present invention does not only relate to the CDN but also to a corresponding method for setting up and/or operating the CDN. For example, the present invention relates, e.g., to a method for delivering and distributing digital contents via a content delivery network (CDN) with at least one CDN origin node and multiple CDN cache nodes which are connected to the CDN origin node via an optical transport network. According to the invention, routing of the digital contents to be delivered takes place from the at least one CDN origin node to the multiple CDN cache nodes and vice versa below layer 3 of the OSI model.

In the following, known CDN architectures as well as preferred embodiments of the present invention will be described with reference to the Figures.

FIG. 1 shows a conventional CDN architecture in Europe (source: StreamZilla). In conventional CDN networks according to FIG. 1, different CDN traffics, e.g. CDN interconnection traffic, i.e. traffic between different CDN networks (preferably bidirectionally), CDN distribution traffic within a CDN from CDN origin to CDN caches (mainly downstream), CDN synchronization traffic within a CDN between CDN origin and CDN caches and CDN cache to CDN cache are delivered via dedicated CDN overlay networks between the corresponding CDN nodes which use the existing conventional IP/MPLS (multiprotocol label switching) optical transport networks (OTN) (CDN over IP over OTN). Hence, they depend on their OTN and IP router resources, which they use together with many other IP services. Thus, delivery losses can occur in the different IP services if capacity overloads occur in the existing IP transport connections.

Figure 2:
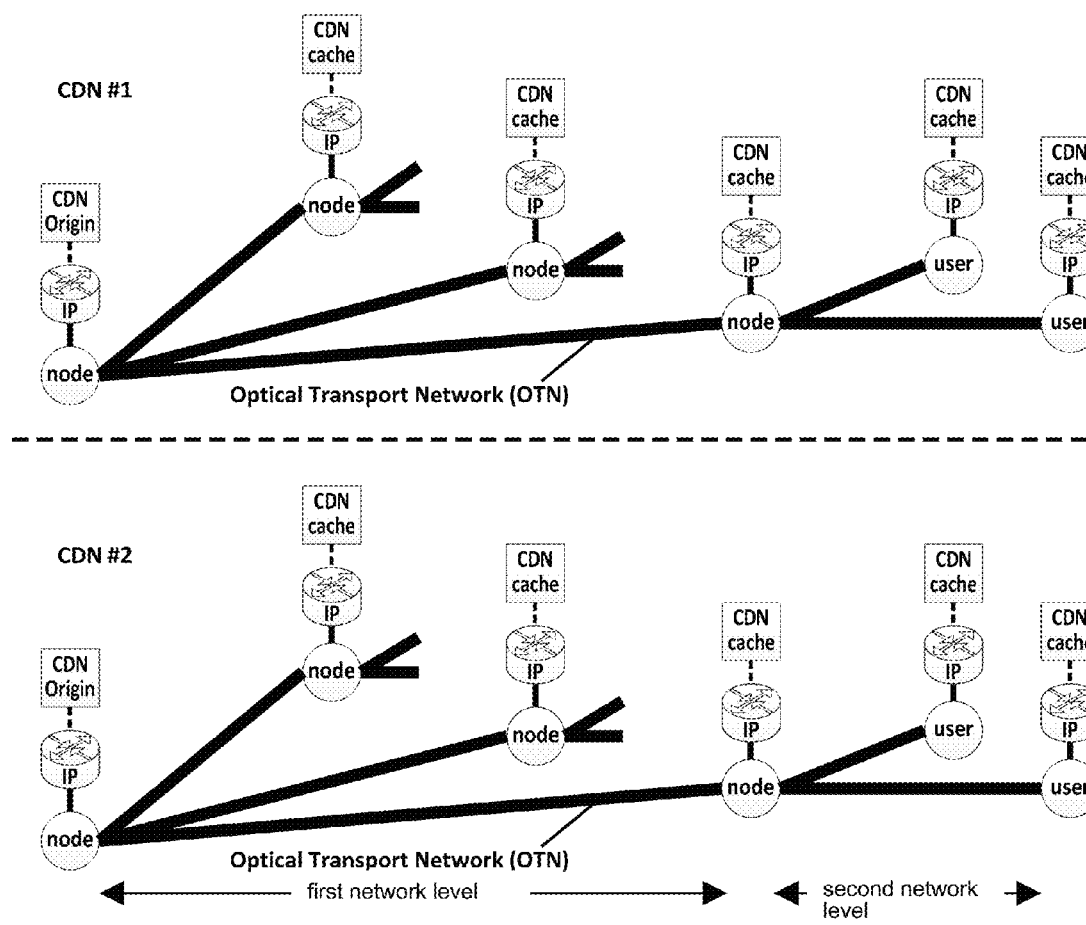
FIG. 2 shows a structural illustration of two independent conventional content delivery networks CDN #1 and CDN #2.

FIG. 2 shows the architecture of two independent conventional content delivery networks CDN #1 and CDN #2, with the components CDN origin and CDN cache, wherein CDN caches upload and/or download content.

In the conventional CDNs, the individual components of the CDN network are connected to each other via an IP/MPLS (internal protocol/multiprotocol label switching) transport network, wherein the IP/MPLS transport network uses the optical transport network (OTN). MPLS allows the connection-oriented delivery of data packets in a connectionless network along a previously built ("signaled") path. This switching method is mainly used by operators of large transport networks which offer speech and data services on the basis of IP (large Internet providers). Hence, the CDN connections are based on a CDN over IP over OTN architecture which must necessarily use the IP router resources of the IP transport network together with non-CDN services. Thus, the conventional CDN network is dependent on the IP transport network and further IP services, and delivery losses caused by non-CDN services can occur if the IP transport network is overloaded.

In accordance with the prior art, the connections between the CDN caches (in the following also referred to as CDN cache nodes) must be realized via the CDN origin node as star point of the CDN network, by using the necessary CDN over IP over OTN resources. Direct transparent optical connections between the CDN caches according to the present invention are preferably not possible.

The physical optical connection can also use corresponding access networks. In particular, the CDN connections are dependent on the IP transport network so that in case of an overload by non-CDN IP services also CDN delivery losses might occur.

In particular, according to the invention a passive transparent optically routed transport network architecture for geographically dedicated selection-free points is provided.

Figure 3:
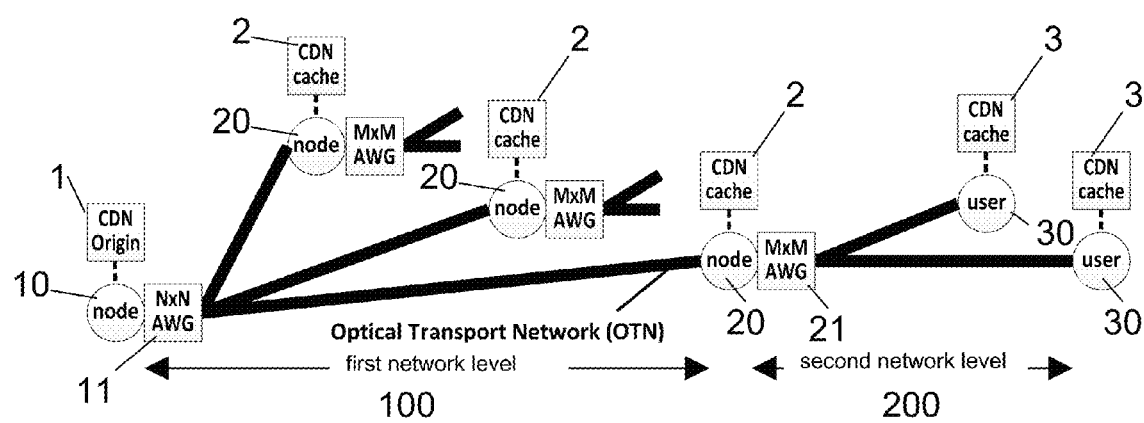
FIG. 3 shows a structural illustration of a CDN network according to the invention.

FIG. 3 schematically shows a CDN architecture on which the invention is based. In contrast to conventional CDN networks, according to the invention a CDN traffic can be realized via an optical transport network, e.g., OTN (CDN over OTN), without the IP layer (or layer 3 of the OSI layer model).

Preferably, data are delivered from a CDN origin 1 to a first node 10, then via an N×N AWG 11 to a second node 20 and further to a CDN cache 2. The delivery from the N×N AWG 11 to the second node 20 is preferably realized via an OTN. The components CDN origin 1, first node 10, N×N AWG 11, OTN, second node 20 and (first) CDN cache 2 are preferably components of a first network level 100.

Moreover, also a delivery further into a second network level 200 can take place, i.e. from the second node 20 via an M×M AWG to a user node 30 (in short: user) and then to a (second) CDN cache 3 (in the following also referred to as CDN cache of the second network level). Preferably M is unequal to N, preferably M<N.

The CDN star topology is preferably maintained for the physical fiber network (optical network), wherein in the star point of a first CDN network level 100 (CDN origin 1-CDN cache 2) a passive optical N×N AWG (arrayed waveguide grating) element 11 can be used, for example as described in the TorNet architecture [6]. Thus, by means of wavelength-addressed DWDM (dense wavelength division multiplex) channels, a full meshing for transparent optical connections between the CDN origin and the CDN cache nodes in the first network level (first CDN network level) is possible (see FIG. 3).

In one or more second CDN network levels 200 (CDN cache-CDN cache) further passive optical M×M AWG elements 21 can be used, so that also in the second CDN network level 200 a wavelength-addressed full meshing becomes possible for transparent optical connections between the CDN origin 1 and CDN cache nodes 3 of the second network level.

By suitably dimensioning the AWG elements with corresponding through-switching in the CDN cache nodes, transparent optical connections can additionally be provided between the first and second CDN network levels.

The CDN networks according to the invention are preferably independent of the IP transport networks. The IP transport networks and in particular the IP router resources and thus also their energy demands can be saved for the CDN networks.

Apart from the independency of the CDN services from non-CDN services, also different CDN services (e.g., CDN content traffics, CDN synchronization traffics, CDN interconnection traffics) can be delivered independent of one another in accordance with the invention, preferably because of a transparent wavelength-addressed optical delivery (CDN service over OTN) in that different transparent optical DWDM channels are assigned to the individual CDN services. These different channels can be configured separately and independently of one another and can also be equipped with different quality characteristics in accordance with the demands.

In contrast thereto, in conventional CDN networks no meshed transparent deliveries are possible in a CDN network but only CDN over IP over OTN within the star topology of the conventional CDN networks. Moreover, no transparent optical connections between CDN origin, CDN cache of the first and/or CDN cache of the second network level are possible.

Figure 4:
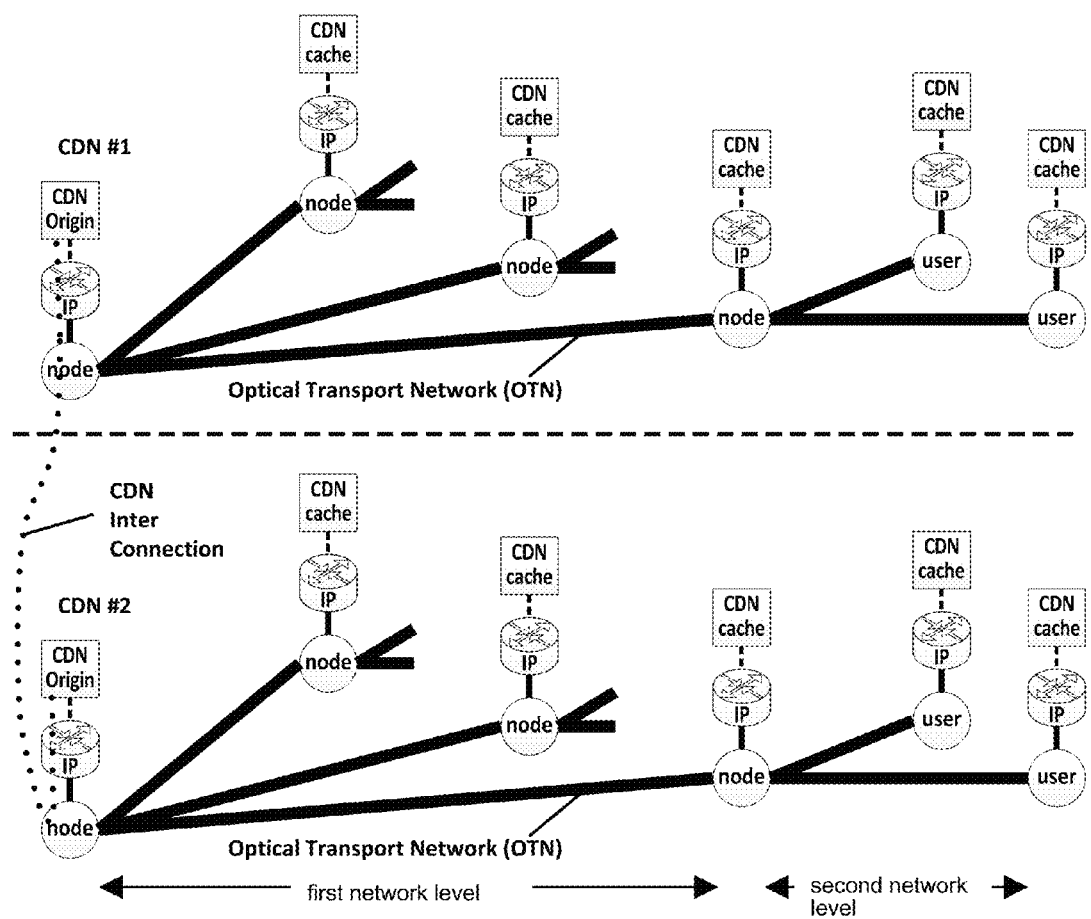
FIG. 4 shows an illustration of a conventional bidirectional CDN interconnection traffic between CDN origin nodes of different CDN networks using the IP transport network (CDN over IP over OTN)

For a conventional CDN architecture, FIG. 4 shows a bidirectional CDN interconnection traffic (see dotted line • • •) between CDN origin nodes of different CDN networks using the conventional IP transport network (CDN over IP over OTN). In particular, the CDN interconnection traffics are also dependent of the IP transport network and its capacities and resources for the optical transport network and its IP routers. Thus, there can he delivery losses caused by overloading of the IP transport network because the different CDN services and also non-CDN services must share the limited IP resources.

Figure 5:
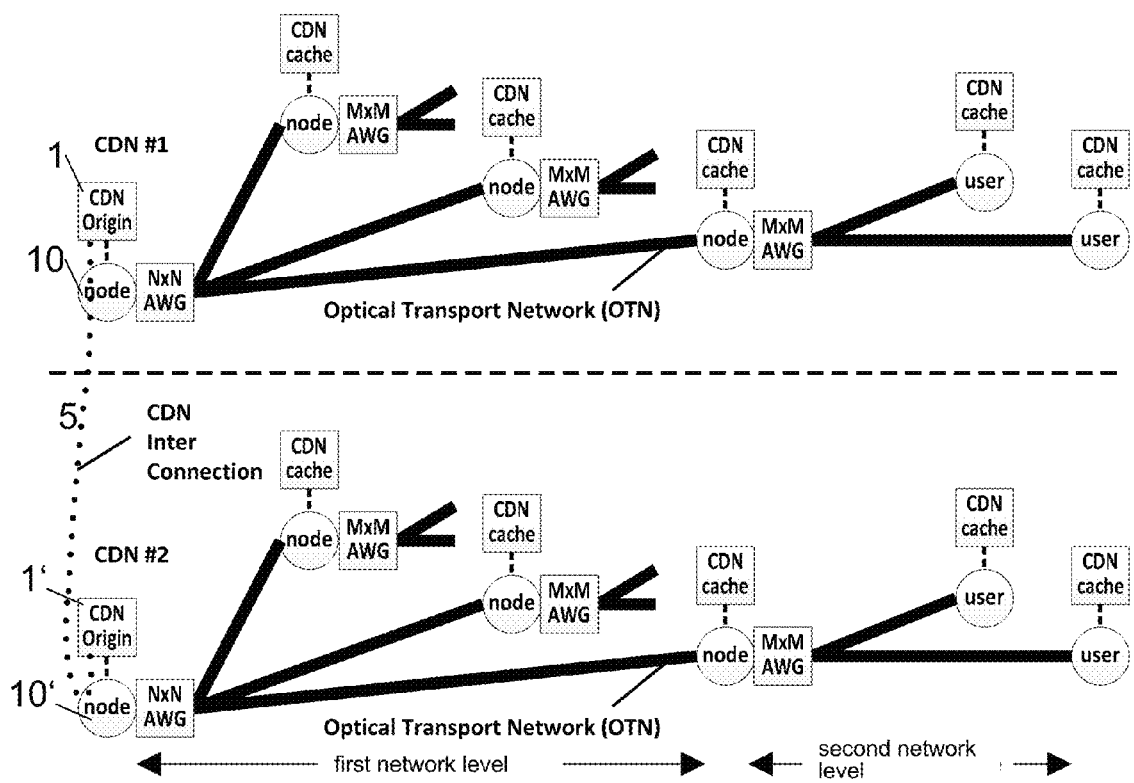
FIG. 5 shows an illustration of the bidirectional CDN interconnection traffic between CDN origin nodes of different CDN networks using the CDN architecture according to the present invention (CDN over OTN)

FIG. 5 shows a bidirectional CDN interconnection traffic 5 (see dotted line • • •) between CDN origin nodes 1, 1' of different CDN networks using the CDN architecture of the present invention (CDN over OTN).

In particular, here the CDN interconnection traffics are decoupled from other CDN services and also from non-CDN services and independent of the IP transport network because of the assignment of own wavelength channels in the OTN network.

Preferably, the delivery of the interconnection traffics is not only limited between the CDN origin nodes of the two CDN networks but, because of the preferred transparent optical full meshing in the first network level and the preferred transparent optical interconnection of the different network levels in the CDN cache nodes, interconnection traffics can preferably also be provided between different CDN origin and CDN cache nodes of the different CDN networks or network levels independent of other services.

Figure 6:
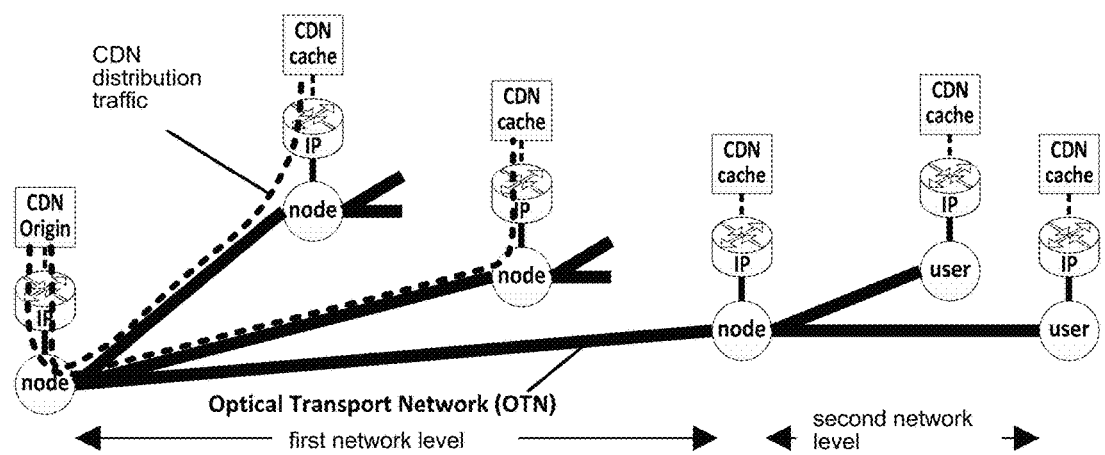
FIG. 6 shows an illustration of a conventional CDN distribution traffic within a CDN from CDN origin to CDN caches.

For a conventional CDN architecture, FIG. 6 shows CDN distribution traffics (see dashed line - - - -) within a CDN from CDN origin to CDN cache (mainly downstream), in particular to a CDN cache of the first network level under the dependent use of the overlay network from the conventional IP over OTN transport network (CDN over IP over OTN). CDN partial traffics of popular Internet contents (downstream) from CDN origin to CDN caches use, depending on the IP transport network, its capacities and resources for the optical transport network and its IP routers.

Figure 7:
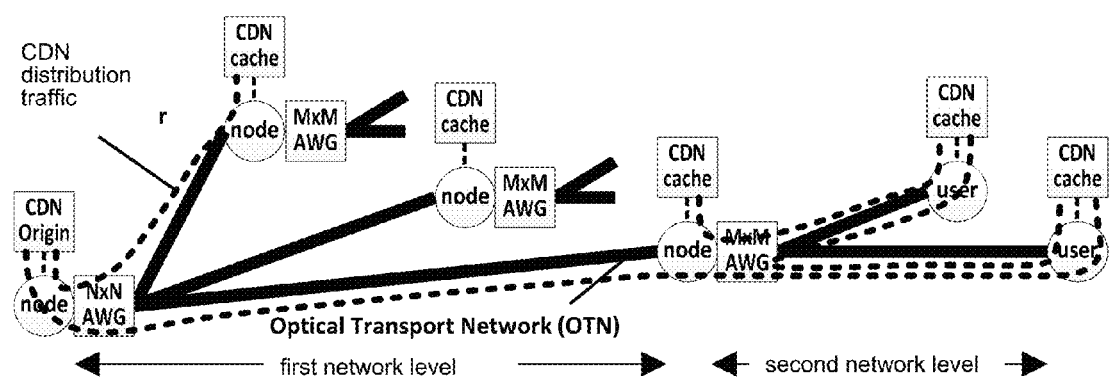
FIG. 7 shows CDN distribution traffics using the CDN architecture according to the present invention (CDN over OTN)

By using the CDN architecture of the present invention (CDN over OTN), FIG. 7 shows CDN distribution traffics (see dashed line - - - -) within a CDN network between CDN origin and CDN caches, in particular between CDN origin and CDN caches of a first or a second network level. Moreover, also traffics between CDN caches of the first and the second network level and between CDN caches of the second network level among each other are shown. The CDN transport network architecture is decoupled from and independent of the conventional CDN over IP over OTN by assigning separate wavelength channels.

CDN distribution traffics of popular Internet contents are, in contrast to conventional CDN networks, possible not only between CDN origin to CDN caches but also randomly between CDN origin, CDN cache of the first or CDN cache of the second network level. Thus, a considerable release of, e.g., the CDN origin node can be achieved and the CDN distribution traffics can be better coordinated individually between the individual CDN nodes.

Figure 8:
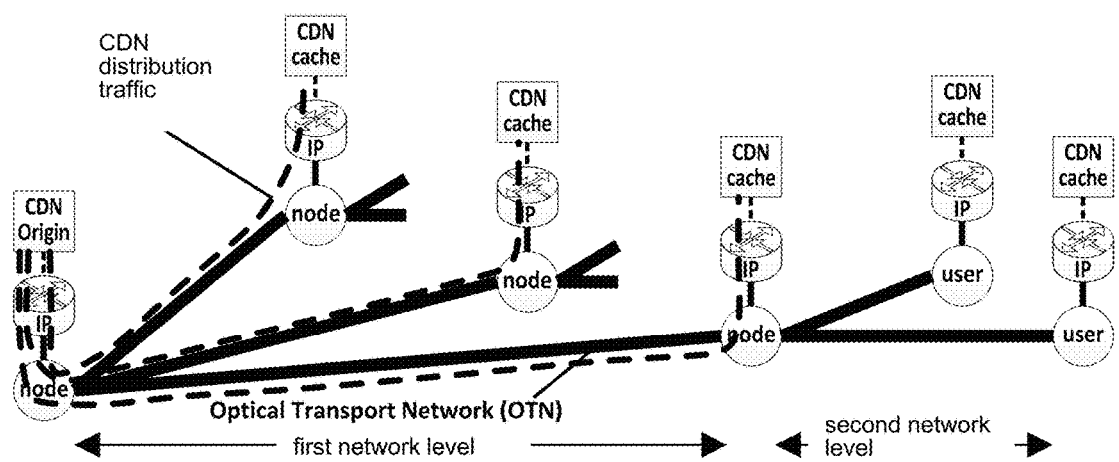
FIG. 8 shows conventional CDN synchronization traffics within a CDN network from CDN origin to CDN cache nodes.

For a conventional CDN architecture, FIG. 8 shows CDN synchronization traffics within a CDN network from CDN origin to CDN cache nodes under the dependent use of the overlay network from the conventional IP over OTN transport network (CDN over IP over OTN). Synchronization traffics between different CDN caches are not realized directly but only indirectly via the CDN origin node. CDN synchronization traffics between CDN origin and CDN caches use, depending on the IP transport network, its capacities and resources for the optical transport network and its IP routers.

Figure 9:
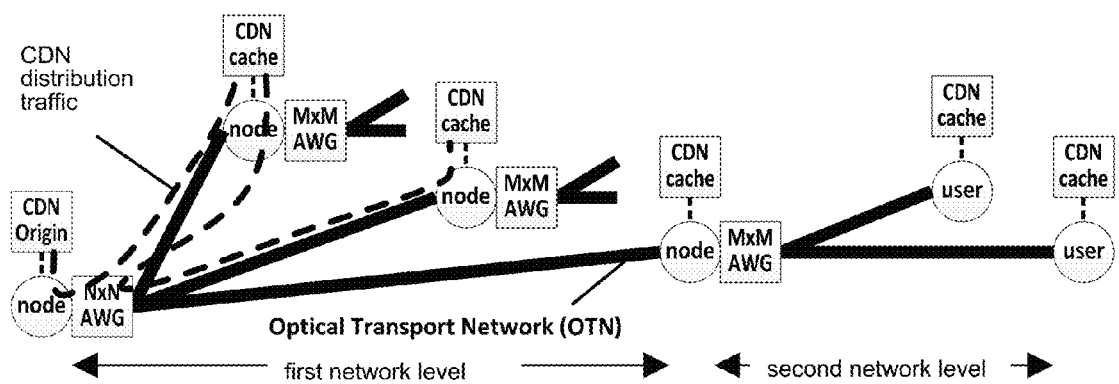
FIG. 9 shows CDN synchronization traffics within a CDN from CDN origin to CDN caches according to the present invention.

By using the CDN architecture of the present invention (CDN over OTN), FIG. 9 shows CDN synchronization traffics within a CDN from CDN origin to CDN caches (bidirectiorially) and also directly between CDN caches via the CDN over OTN transport network being independent of the IP transport network by incorporating the transport network architecture according to the invention, decoupled from the IP over OTN by assigning own wavelength channels. CDN synchronization traffics between CDN origin and CDN caches and also between CDN caches among each other use preferably, independent of the IP transport system and its resources, only the infrastructure of the optical transport network OTN (CDN over OTN).

Prior art for DWDM services and commercially available is presently a spectral efficiency of 2 bit/s/Hz, wherein data rates of 100 Gbit/s and 40 Gbit/s can be delivered with delivery bandwidths of 50 GHz and 25 GHz via optically transparent paths with non-compensated standard single mode fibers.

In a commercial 96 channel DWDM system with 50 GHz bandwith per channel, 100 Gbit/s can be delivered per channel over 3.000 km in an optically transparent manner [7]. 40 Gbit/s per channel can be delivered over 9.000 km in an optically transparent manner [8].

By means of these presently available means, simple and cost-efficient CDN systems can be built in accordance with the invention, which cover for example a continental area, e.g., the entire European area, and even more, wherein preferably only the necessary layer 1 delivery technology is built up and the number of the above-lying switch and router systems is minimized.

The physical glass fiber star network topology according to FIG. 3 can also reduce the necessary fiber lengths as compared to a topological fiber part or full meshing in conventional IP transport networks.

The network architecture according to the invention preferably comprises two network levels, wherein the network reliability in view of fiber interruptions can be increased by building further disjunctive star networks.

First, only one network level (e.g., the first network level) is considered, wherein preferably a passive optical N×N AWG element is located in the star point, so that one respective fully meshed network can be provided on the wavelength level. The number of nodes N, including the star node, corresponds to the port number N for the optical inputs and outputs of the N×N AWGs.

In commercial CWDM systems, e.g., 96 channels, each having a bandwidth of 50 GHz, are available for the optical C-band. Hence, a total delivery bandwidth of 96×50 GHz=4.800 GHz per fiber is available for a unidirectional delivery. In case of a bidirectional fiber connection, a bandwidth of 4.800 GHz is available for each direction for the DWDM channels [9].

Because of the full meshing on the wavelength level, the node-to-node bandwidth between two arbitrary nodes of a network level is equal to the overall bandwidth of 4.800 GHz divided by the number of nodes N, which is also equal to the number of required wavelengths for a full meshing.

Node-to-node bandwidth=4.800 GHz/number of nodes N (for a network level) with N=number of nodes of the network level Table 2 shows the number of bidirectional node-to-node (K-z-K) connections in case of full meshing, the bandwidth of the individual K-z-K connections, the number of K-z-K DWDM channels for 50 GHz, 25 GHz and 12.5 GHz channels, and the available overall bandwidth in a network level depending on the number of nodes.

duplex links (full meshing)=N*(N−1)/2

TABLE 2

| number of nodes in the network | K-z-K number of bidirectional connections in case of full meshing | K-z-K bandwidth in GHz | K-z-K number of 50 GHz channels | K-z-K number of 25 GHz channels | K-z-K number of 12.5 GHz channels | overall bandwith in the network in THz |
|---|---|---|---|---|---|---|
| 4 | 6 | 1200 | 24 | 48 | 96 | 7.2 |
| 6 | 15 | 800 | 16 | 32 | 64 | 12 |
| 8 | 28 | 600 | 12 | 24 | 48 | 16.8 |

TABLE 2-continued

| number of nodes in the network | K-z-K number of bidirectional connections in case of full meshing | K-z-K bandwidth in GHz | K-z-K number of 50 GHz channels | K-z-K number of 25 GHz channels | K-z-K number of 12.5 GHz channels | overall bandwith in the network in THz |
|---|---|---|---|---|---|---|
| 12 | 66 | 400 | 8 | 16 | 32 | 26.4 |
| 16 | 120 | 300 | 6 | 12 | 24 | 36 |
| 24 | 276 | 200 | 4 | 8 | 16 | 55.2 |
| 32 | 496 | 150 | 3 | 6 | 12 | 74.4 |
| 48 | 1128 | 100 | 2 | 4 | 8 | 112.8 |

Table 2a lists the number of bidirectional node-to-node (K-z-K) connections in case of full meshing, the bandwidth of the individual K-z-K connections, the number of K-z-K DWDM channels for 50 GHz, 25 GHz and 12.5 GHz channels, and the available overall bandwidth in the network depending on the number of nodes.

\# duplex links (full meshing and on itself)=N*N/2

TABLE 2a

| number of nodes in the network | K-z-K number of bidirectional connections in case of full meshing and on itself | K-z-K bandwidth in GHz | K-z-K number of 50 GHz channels | K-z-K number of 25 GHz channels | K-z-K number of 12.5 GHz channels | overall bandwith in the network in THz |
|---|---|---|---|---|---|---|
| 4 | 8 | 1200 | 24 | 48 | 96 | 9.6 |
| 6 | 18 | 800 | 16 | 32 | 64 | 14.4 |
| 8 | 32 | 600 | 12 | 24 | 48 | 19.2 |
| 12 | 72 | 400 | 8 | 16 | 32 | 28.8 |
| 16 | 128 | 300 | 6 | 12 | 24 | 38.4 |
| 24 | 288 | 200 | 4 | 8 | 16 | 57.6 |
| 32 | 512 | 150 | 3 | 6 | 12 | 76.8 |
| 48 | 1152 | 100 | 2 | 4 | 8 | 115.2 |

In particular, generally smaller bandwidth granularities can be provided within the, e.g., 50 GHz channels for being able to provide, e.g., further independent optical delivery channels for different services.

The overall capacity in terabits/s results from the overall bandwidth multiplied by the spectral efficiency of the delivery format.

overall capacity (Gbit/s)=spectral efficiency (bit/s/Hz) *overall bandwidth (GHz)

At present, a spectral efficiency of 2 bit/s/Hz is commercially available, wherein 100 Gbit/s can be delivered in an optically transparent manner (without electrical regeneration) via DWDM channels having a bandwidth of 50 GHz over>3.000 km [7]. Thus, the presently commercially available overall capacity in a network level in Gbit/s equals to twice the overall bandwidth in GHz.

Higher spectral efficiencies are possible, depending on the delivery range, which decreases at the same bit rate as the spectral efficiency becomes higher. At present, 40 Gbit/s per channel can be delivered in an optically transparent manner over 9.000 km [8].

A further embodiment of the present invention are optically transparent interconnections of the first network level with different second network levels in the CDN cache nodes. As compared to conventional CDN networks, transparent optical connections between CDN origin, CDN cache of the first and CDN cache of the second network level become possible without transit IP routers, so that further IP routers and energy resources can be saved.

According to an embodiment of the present invention, IP servers are preferably required only in the end nodes of the second network level, in contrast to conventional CDN networks, so that costs can be minimized.

It is a further preferred embodiment of the present invention that transceivers are preferably only required in the end nodes of the second network level, in contrast to conventional CDN networks, so that costs can be minimized.

Additionally, strategies for minimizing the delivery capacities between the individual CDN nodes can be developed.

For example, in a first step, the content can be delivered from a node of the second network level in parallel to a corresponding node in all other second network levels, as well as to all nodes in the own second network level. In a second step, the content is then delivered in parallel in all other second levels to the corresponding nodes in the corresponding second levels. This means that in only two steps the content can be distributed in parallel and simultaneously to all nodes of the CDN network, so that a prompt content distribution becomes possible. In particular, also the latencies (delays) can be minimized, which are limited mainly by the delivery lengths of the glass fibers and not by possible overloads in the IP routers.

In the CDN cache nodes, the two network levels are preferably interconnected such that each CDN cache node of the first network level can also reach specific CDN user nodes in the second network levels in a transparent optical manner with specific bandwidths. Hence, there are preferably two different kinds of connections for the second network levels.

First kind of connection: Transparent optical fully meshed connections between nodes in the same second network level, i.e. which are not guided via the first network level.

Second kind of connection: Transparent optical transit connections between nodes in different second network levels, which have to be supplied via the first network level.

A further preferred embodiment are resilient CDN networks with different functionalities, which can partly be carried out independent of each other redundantly, e.g., a redundant physical star network in the first level, a redundant AWG1 in the first level, redundant physical star networks in the areas of the second level, redundant AWG2 in the areas of the second level, redundant transit points between the first network level and the areas of the second network levels, and redundant end nodes in the areas of the second network level.

According to a further preferred embodiment, end nodes, preferably each end node, can be determined as center for contents. Thus, the CDN network is decentralized and different content categories can be assigned to different centers. Thus, the traffics can be decentralized and distributed more equally across the network. At the same time, optimum strategies for distributing the content data can be used for each node, wherein each node in the CDN network can be reached preferably via at the most one intermediate node with CDN server (2 hops).

According to a further preferred embodiment, on the one hand, a full meshing of all nodes in the first network level and, on the other hand, also full meshings between the nodes in each area of the second network levels are possible. However, it is not necessary to plan and carry out a complete full meshing in the individual areas or network levels during the first network setup, but it can be set up as required. The further CDN network expansion can also be in accordance with the demand and requirements.

Figure 10:
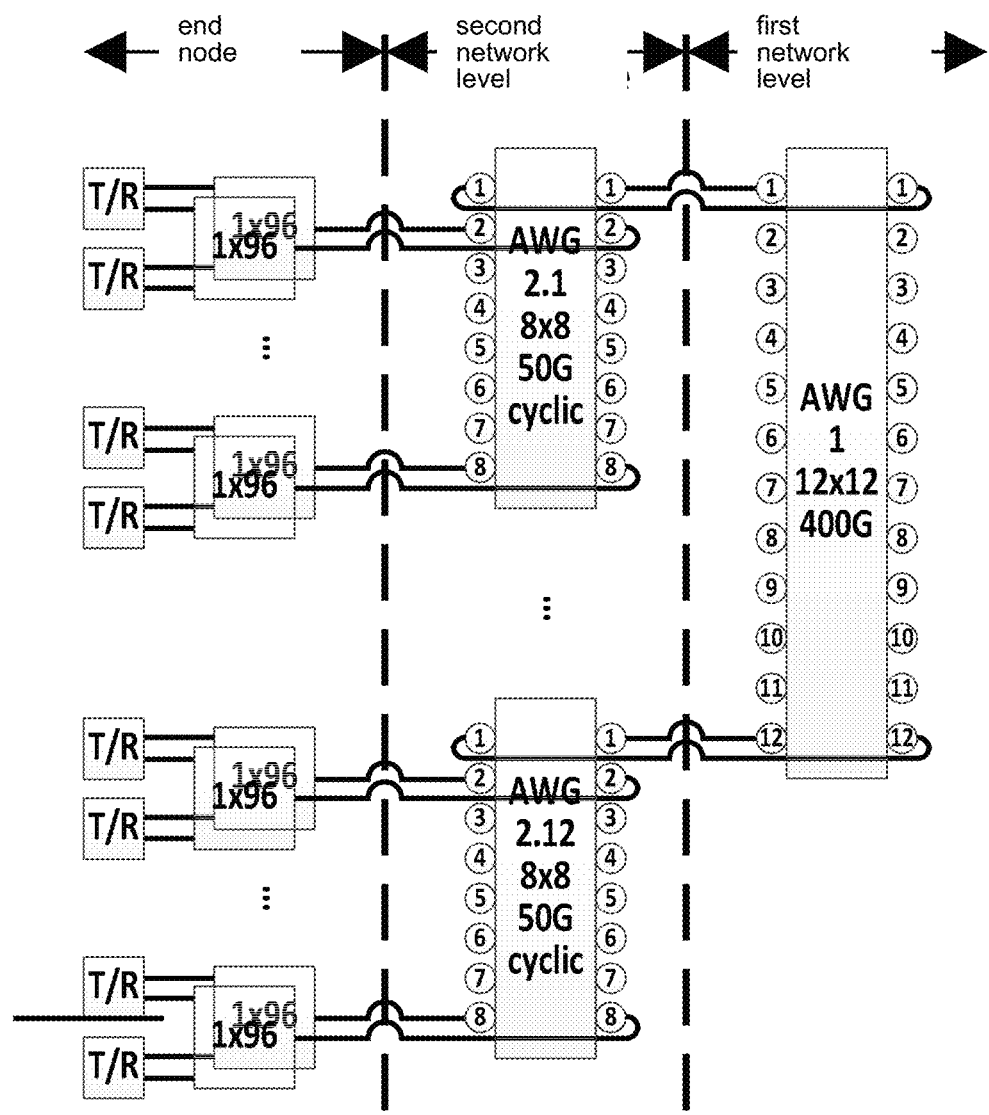
FIG. 10 shows a network architecture of two optically transparently interconnected network levels.

FIG. 10 shows a network architecture and interconnection of the AWGs of the different network levels, on which the invention is preferably based, on the basis of an example with a respective 8×8 port AWG in the twelve second network levels and a 12×12 port AWG in the first network level. Seven end nodes per area of the second network level are interconnected to the AWG ports 2 to 7. The ports 1 of the second network level are connected to the AWG ports of the first network level, wherein the area 1 of the second network level is connected via fiber connections to the AWG port 1 of the first network level, the area 2 of the second network level to the AWG port 2 of the first network level, the area 3 of the second network level to the AWG port 3 of the first network level, etc., up to the area 12 of the second network level which is connected to the AWG port 12 of the first network level. This leads to transparent optical connections without further components in the delivery path, apart from possible optical amplifiers, which have to compensate for corresponding insertion losses due to fiber lengths and the AWGs. The insertion loss of an AWG ranges between 5 to 8 dB.

The specific interconnection of the AWGs of the first and second levels can be achieved by different port numbers N and M for the AWGs of the first and second levels, which are shown, e.g., in Table 3. In particular, interconnections between the levels for AWGs with port numbers (N, M) for the following combinations make sense: (3,32), (4,24), (6,16), (8,12), (12,8), (16,6), (24,4) and (32,3), wherein M is derived from N in accordance with the following formula: M=4.800 GHz/50 GHz/N=96/N.

Table 3 exemplarily shows parameters for the interconnection of different network levels for providing fully meshed transparent optical end-to-end connections between nodes in the field in different second network levels.

TABLE 3

| Stage 1 N N×N AWG1 In C-band | Stage 1 AWG1 band bandwidth in GHz | Stage 1 # of 50 GHz channels per AWG1 band | Stage 2 M M×M AWG1 cyclic | Stage 2 AWG2 band bandwidth = 50 GHz | Stage 2 # of parallel full meshes |
|---|---|---|---|---|---|
| 3 | 1600 | 32 | 32 | 50 | 3 |
| 4 | 1200 | 24 | 24 | 50 | 4 |
| 6 | 800 | 16 | 16 | 50 | 6 |
| 8 | 600 | 12 | 12 | 50 | 8 |
| 12 | 400 | 8 | 8 | 50 | 12 |
| 16 | 300 | 6 | 6 | 50 | 16 |
| 24 | 200 | 4 | 4 | 50 | 24 |
| 32 | 150 | 3 | 3 | 50 | 32 |

Table 3 additionally shows the AWG1 band and AWG2 band bandwidths, the number of 50 GHz channels for the AWG1 band of the first level, the number of 50 GHz channels for the single AWG2 band of the second levels (=50 GHz) and the number of fully meshed networks per network of the second level.

In particular, the N×N AWG1 of the first level is designed such that it has, e.g., only one cycle with N=12 channels with 400 GHz per channel.

In particular, the M×M AWG2 of the second levels are designed such that they have N cycles with M=50 GHz channels per cycle.

In particular, in accordance with the present invention all AWG2 of the second levels have the same design, i.e. they have the same characteristics and also the same number of ports M.

Figure 11:
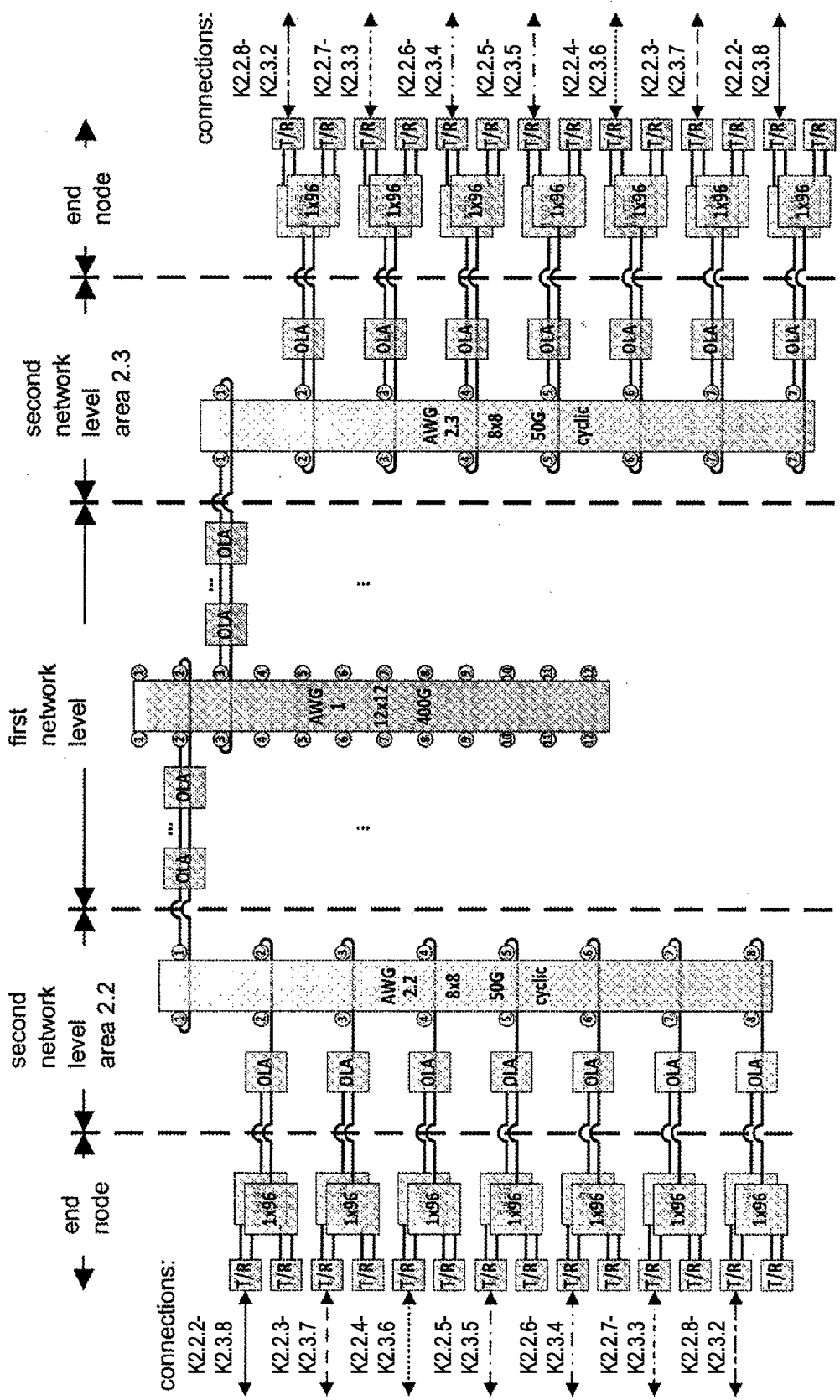
FIG. 11 shows an end-to-end-node connection scheme between two different areas of the second network level.

In particular, this specific interconnection leads to multiple transparent optical and thus independent connections between all areas of the second levels, wherein, however, only specific nodes of different second areas are connected to each other in a transparent optical manner. FIG. 11 shows the end-to-end-node connection scheme between two different areas of the second network level, area 2 and area 3, which are connected in an optically transparent manner via the transit connections via the first network level 1. Also the use of bidirectional optical line amplifiers (OLAs) can become necessary in the optically transparent connections in the different network levels and areas in order to compensate for insertion loss caused by glass fiber lengths and the AWGs.

There are the following network parameters for the example shown in FIG. 11:

In the first network level a 12×12 AWG1 with 12 channels with a bandwidth of 400 GHz is used, to which twelve different areas of the second level are connected in an optically transparent manner.

An 8×8 AWG2 with eight channels with a bandwidth of 50 GHz is used per area in the second network level, wherein the eight channels continue cyclically with the frequency, so that at total of 12 cyclic bands with 8×50 GHz channels each provide a total number of 12×8=96 wavelength channels with 50 GHz.

The AWG2 input and output ports 1 are connected to the AWG1 of the first network level as transit ports.

In an area of the second network level, thus at the most seven nodes can be fully meshed with each other.

For a full meshing in an area of the second network level, eight optical wavelengths are preferred.

For a full meshing in an area of the second network level, 7×6/2=21 wavelength channels with 50 GHz are available. If a 100 Gbit/s signal is delivered via a 50 GHz channel (spectral efficiency=2 bit/s/Hz), the delivery capacity within a fully meshed network is 21×100 Gbit/s=2.1 Tbit/s.

Within an area of the second level, a total of 96/8=12 parallel and independent fully meshed networks are possible, which can be used, e.g., by different services in parallel and independent of one another. The total number of possible 50 GHz channels is thus 21×12=252. If a 100 Gbit/s signal is delivered via a 50 GHz channel (spectral efficiency=2 bit/s/Hz), the overall delivery capacity within an area of the second network level is equal to 252×100 Gbit/s=25.2 Tbit/s.

The overall delivery capacity of all 12 areas results in 12×25.2 Tbit/s=302.4 Tbit/s.

The optically transparent transit connections between nodes of different areas of the second network level are preferably guided via the first network level.

Between each area of the second level, seven parallel and independent connections can be provided which, in accordance with FIG. 11, e.g., connect the respective nodes of the selected areas as follows: (K2.2.2-K2.3.8), (K2.2.3-K2.3.7), (K2.2.4-K2.3.6), (K2.2.5-K2.3.5), (K2.2.6-K2.3.4), (K2.2.7-K2.3.3), (K2.2.8-K2.3.2). For example, K2.3.8 should be read as follows: node 8 from area 3 of network level 2. In particular, all nodes from the different areas of the second network levels are connected in accordance with this scheme (node 2 from area x is connected to node 8 from area y) (K2.x.2-K2.y.8), (K2,x.3-K2.y.7), (K2.x.4-K2.y.6), (K2.x.5-K2.y.5), (K2.x.6-K.2.y.4), (K2.x.7-K2.y.3), (K2.x.8-K2.y.2).

In the first network level, 12 transit points are fully meshed with each other, so that the fully meshed network of the first level comprises 12×11/2=66 bidirectional connections. Each of these connections of the first network level can guide up to seven end-to-end node connections between the corresponding two areas of the second network level. Hence, a total of 66×7=462 transparent optical bidirectional 50 GHz connections via the first network level can be provided. If a 100 Gbit/s signal is delivered via a 50 GHz cannel (spectral efficiency=2 bit/s/Hz), the delivery capacity within the fully meshed network of the first level is 462×100 Gbit/s=46.2 Tbit/s.

If the network is expanded fully with the transit network of the first level and the 12 areas of the second network level, the overall capacity of the entire network is thus 302.4 Tbit/s+46.2 Tbit/s=348.6 Tbit/s.

If the network is at first only expanded basically with a full meshing of all 12 areas of the second level with seven nodes each, the number of all 50 GHz channels is 12×7*6/2=252. If additionally only a respective 50 GHz channel between each area of the second network level is used over a full meshing of the first level, there are additionally 12×11/2=66 transit channels. Hence, for a basic expansion, there are 252+66=318 wavelength channels with a bandwidth of 50 GHz. If a 100 Gbit/s signal is delivered via a 50 GHz channel (spectral efficiency=2 bits/Hz), the delivery capacity for the basic expansion at issue is 31.8 Tbit/s.

The parameters depending on the port number of the AWG1 in the first network level are summarized in table 4.

For bridging distances, bidirectional optical line amplifiers (OLAs) can be used in the first network level and also in the second network levels. The number of OLAs connected in series is limited by the overall delivery length and by the delivery rate, wherein for 100 Gbit/s systems an overall length of up to more than 3.000 km and for 40 Gbit/s systems of up to more than 9.000 km can be bridged.

In the fiber infrastructure, in particular no compensation components for, e.g., fiber dispersion, polarization dispersion or the like are used.

Table 4 exemplarily shows network capacities in the interconnection of network levels for providing fully meshed transparent optical end-to-end connections between the nodes of the second network level with end points in the field.

Table 4a exemplarily shows the network capacities in the interconnection of network levels for providing fully meshed transparent optical end-to-end connections between the nodes of the second network level with end points in the field, wherein transit connections from an AWG2 area via the AWG1 level are present also back into the same AWG2 area (see also Table 2a).

TABLE 4

| stage 1 N NxN AWG1 in C-Band | stage 1 full mesh # of 50 GHz basic connects transit | stage 1 SE = 2 capacity basic connects total Tbit/s | stage 1 full mesh # of 50 GHz total connects transit | stage 1 SE = 2 capacity total connects total Tbit/s | stage 2 M MxM AWG2 cyclic |
|---|---|---|---|---|---|
| 4 | 6.00 | 0.60 | 138.00 | 13.80 | 24.00 |
| 6 | 15.00 | 1.50 | 225.00 | 22.50 | 16.00 |
| 8 | 28.00 | 2.80 | 308.00 | 30.80 | 12.00 |
| 12 | 66.00 | 6.60 | 462.00 | 46.20 | 8.00 |
| 16 | 120.00 | 12.00 | 600.00 | 60.00 | 6.00 |
| 24 | 276.00 | 27.60 | 828.00 | 82.80 | 4.00 |
| 32 | 496.00 | 49.60 | 992.00 | 99.20 | 3.00 |

| stage 1 N NxN AWG1 in C-Band | stage 2 full mesh # of 50 GHz basic connects local (1 transit) | stage 2 SE = 2 capacity basic connects local (1 transit) Tbit/s | stage 2 # of parallel full meshes local (1 transit) | stage 2 full mesh # of 50 GHZ total connects local (1 transit) | stage 2 SE = 2 capacity total connects local (1 transit) Tbit/s |
|---|---|---|---|---|---|
| 4 | 253.00 | 25.30 | 4.00 | 1,012.00 | 101.20 |
| 6 | 105.00 | 10.50 | 6.00 | 630.00 | 63.00 |
| 8 | 55.00 | 5.50 | 8.00 | 440.00 | 44.00 |

TABLE 4-continued

| 12 | 21.00 | 2.10 | 12.00 | 252.00 | 25.20 |
| 16 | 10.00 | 1.00 | 16.00 | 160.00 | 16.00 |
| 24 | 3.00 | 0.30 | 24.00 | 72.00 | 7.20 |
| 32 | 1.00 | 0.10 | 32.00 | 32.00 | 3.20 |

| stage 1 N NxN AWG1 in C-Band | all stages 2 1 transit # of 50 GHz total connects 1 transmit | all stages 2 SE = 2 capacity transit total connects Tbit/s | stage 1 + all stages 2 total network capacity of basic connects Tbit/s | stage 1 + all stages 2 total network capacity of total connects Tbit/s | stage 1 full mesh # of 50 GHz basic connects transit |
| --- | --- | --- | --- | --- | --- |
| 4 | 4,048.00 | 404.80 | 101.80 | 418.60 | 8.00 |
| 6 | 3,780.00 | 378.00 | 64.50 | 400.50 | 18.00 |
| 8 | 3,520.00 | 352.00 | 46.80 | 382.80 | 32.00 |
| 12 | 3,024.00 | 302.40 | 31.80 | 348.60 | 72.00 |
| 16 | 2,560.00 | 256.00 | 28.00 | 316.00 | 128.00 |
| 24 | 1,728.00 | 172.80 | 34.80 | 255.60 | 288.00 |
| 32 | 1,024.00 | 102.40 | 52.80 | 201.60 | 512.00 |

| stage 1 N NxN AWG1 in C-Band | stage 1 SE = 2 capacity basic connects total Tbit/s | stage 1 full mesh # of 50 GHz total connects transit | stage 1 SE = 2 capacity total connects total Tbit/s | stage 2 M MxM AWG2 cyclic |
| --- | --- | --- | --- | --- |
| 4 | 0.80 | 184.00 | 18.40 | 24.00 |
| 6 | 1.80 | 270.00 | 27.00 | 16.00 |
| 8 | 3.20 | 352.00 | 35.20 | 12.00 |
| 12 | 7.20 | 504.00 | 50.40 | 8.00 |
| 16 | 12.80 | 640.00 | 64.00 | 6.00 |
| 24 | 28.80 | 864.00 | 86.40 | 4.00 |
| 32 | 51.20 | 1,024.00 | 102.40 | 3.00 |

TABLE 4a

| stage 1 N NxN AWG1 in C-Band | stage 2 full mesh # of 50 GHz basic connects local (1 transit) | stage 2 SE = 2 capacity basic connects local (1 transit) Tbit/s | stage 2 # of parallel full meshes local (1 transit) | stage 2 full mesh # of 50 GHz total connects local (1 transit) | stage 2 SE = 2 capacity total connects local (1 transit) Tbit/s |
| --- | --- | --- | --- | --- | --- |
| 4 | 253.00 | 25.30 | 4.00 | 1,012.00 | 101.20 |
| 6 | 105.00 | 10.50 | 6.00 | 630.00 | 63.00 |
| 8 | 55.00 | 5.50 | 8.00 | 440.00 | 44.00 |
| 12 | 21.00 | 2.10 | 12.00 | 252.00 | 25.20 |
| 16 | 10.00 | 1.00 | 16.00 | 160.00 | 16.00 |
| 24 | 3.00 | 0.30 | 24.00 | 72.00 | 7.20 |
| 32 | 1.00 | 0.10 | 32.00 | 32.00 | 3.20 |

| stage 1 N NxN AWG1 in C-Band | all stages 2 1 transit # of 50 GHz total connects 1 transit | all stages 2 SE = 2 capacity transit total connects Tbit/s | stage 1 + all stages 2 total network capacity of basic connects Tbit/s | stage 1 all stages 2 total network capacity of total connects Tbit/s |
| --- | --- | --- | --- | --- |
| 4 | 4,048.00 | 404.80 | 102.00 | 423.20 |
| 6 | 3,780.00 | 378.00 | 64.80 | 405.00 |
| 8 | 3,520.00 | 352.00 | 47.20 | 387.20 |
| 12 | 3,024.00 | 302.40 | 32.40 | 352.80 |
| 16 | 2,560.00 | 256.00 | 28.80 | 320.00 |
| 24 | 1,728.00 | 172.80 | 36.00 | 259.20 |
| 32 | 1,024.00 | 102.40 | 54.40 | 204.80 |

In the following, features of the invention are discussed briefly and in summarized form.

Sub-channels are guided preferably transparently into the area to the dedicated points.

Delivery via dedicated transparent optical connections of locations in the area is possible because of the transport network architecture of the invention.

Within a CDN, transparent CDN over OTN connections between CDN origin and CDN caches, between CDN cache and CDN cache of the same network level, and also between CDN caches of different network levels are possible.

Between different CDNs, transparent CDN over OTN connections between CDN origins, between CDN origin and CDN caches, and also between CDN caches are possible.

Because of the transport network architecture of the invention, full meshing between the CDN origin nodes of the first network level and also between the CDN caches within each area of the second network levels becomes possible.

Because of the hierarchical transport network architecture of the invention, a transparent partial meshing between the user nodes becomes possible within a CDN.

Multiple sub-networks with different locations are possible.

Multiple fully meshed sub-networks are possible within a sub-network (dedicated CDN network).

Because of the transport network architecture of the invention, several of these fully meshed virtual networks are simultaneously possible (different CDN network services).

Multiple connection services are simultaneously possible in the same CDN fully meshed network, e.g., CDN data traffic and CDN synchronization traffic.

Because of the transport network architecture of the invention, latency reductions by transparent optical end-to-end connections and also a dedicated and adaptable bandwidth control are possible.

Because of the transport network architecture of the invention, a cost effective provision of the presently described network architecture+extended feeder in the area plus extreme scalability in connection with fine granular bandwidth is possible.

During expansion, only changes at the edge of the second network levels are necessary, e.g., for providing a fiber connection to new locations. In particular, no changes in the first network level and its interconnection to the second network levels are necessary. In addition, no changes in the conventional IP protocol are necessary.

Because of the invention, the dedicated CDN network (CDN over OTN) can be operated independent of the conventional IP transport network (IP over OTN) and its optical transport network and IP router resources.

Recursive application of the concept in the field of access/aggregation is possible.

The invention comprises the use of transparent optically routed network levels and their active and passive interconnections to an overall concept for a simple, scalable and cost-efficient CDN network with low CAPEX and reduced OPEX for their setup and expansion, which can satisfy the future multi-Tbit/s traffic demand. For this purpose, a continental network with transparent lengths of >10.000 km can be set up, so that the use of switches and routers is minimized by optical full meshing and preferably transparent optical 1-hop connections between the CDN origins and CDN caches are provided. Hence, additionally also the energy demand is reduced considerably.

For the delivery via several 100 km to several 1000 km, it is possible to use optical transport networks (OTNs) which provide optically transparent connections, wherein in particular optical amplifiers in the C-band, e.g., prior art: erbium-doped fiber amplifiers (EDFA) can be used. In particular, however, no dispersion compensation measures should be carried out in the fiber network of the OTN. Thus, the transparent optical connection only consists of glass fibers and optical amplifiers. The compensation of further influences, e.g., dispersion, polarization mode dispersion, etc. is carried out by digital signal processing in the transceivers (prior art).

Advantages

As compared to conventional networks, the invention allows the cost-effective provision of high-capacity CDN services via the passive transparent optically routed architecture according to the invention. The CDN architecture is supported by one or few origin and many cache servers.

As compared to conventional networks, the invention allows the high-scaling provision of high-capacity CDN services via the passive transparent optically routed architecture according to the invention. This is necessary for being able to provide the expected capacity increases of >100% per year.

The invention allows the full meshing of dedicated CDN sub-networks, wherein multiple levels can be used separately and independently of each other for different tasks, e.g., for CDN data traffic, or CDN synchronization traffic, . . . .

The invention can be implemented as separate network (overlay) and thus offers to network providers the possibility of migration towards software-defined networks (SDNs) and also access to network virtualization with the aim of an improved utilization of available technology, which, however, does not form part of this patent.

The invention allows independent and blocking-free connections between the individual locations and also for the individual applications (CDN distribution network, CDN synchronization, CDN interconnections, further future applications) by assigning optical wavelengths for the corresponding connections.

The content distribution is decisively simplified and realized by means of a combination of directed passive optical distribution and native IP. The use of complex protocols such as multicast thus is no longer necessary and scalability of the approach is decisively increased (by magnitudes).

The invention allows the application-agnostic assignment of capacities and resources in the optical transport network.

The invention allows the use of complex and thus cost-intensive multicast trees in the IP protocol by accordingly configuring the wavelengths in the suggested network architecture.

The invention allows the mapping of dynamically fluctuating traffic demands (traffic matrices) without impairing the stability of the network, as this is possible in IP/MPLS.

The invention allows the delivery of many sources to a sink with step-less adjustment of the capacity per source (multipoint-to-point). Hence, the invention allows load balancing between different applications on different source servers. Applications are content delivery networks and hybrid networks.

The invention allows the simple optical replication of content.

According to the invention, the quick optimization of the suggested CDN network architecture by switching-on and switching-off individual and independent transparent link capacities is always possible because of link measurements, in contrast to the control and optimization of IP networks by link weights and traffic matrices which, e.g., are carried out only once a day in order to avoid network instabilities.

The invention allows the transparent connection to the CDN locations in the area, wherein the limited numbers of CDN locations should be switched transparently and cost-efficiently via separate free fibers in the existing network infrastructure to the star points of the CDN topology.

So far, all CDN connections have been switched via IP/MPLS router connections (CDN over IP over OTN) and have used their OTN and IP router resources.

Here, all CDN connections are provided via a transparent CDN over OTN network being independent of the IP transport network.

So far, CDN connections have been dependent on the IP transport network. The CDN traffics are delivered in a shared manner together with many other traffics so that losses caused by overload might occur.

Here, the CDN connections are independent of the IP transport network. A mutual influence of CDN traffics with IP transport network traffics is excluded.

So far, there have not been direct CDN connections between CDN caches. The CDN caches have only been connected to the CDN origins because of the physical CDN over IP star structure.

Here, there are transparent connections between CDN cache nodes of different areas of the second network levels because of the logical and wavelength-addressed meshing.

So far, there have not been direct optically transparent CDN connections between CDN cache and CDN origin or CDN cache.

Here, transparent optical connections can be switched between dedicated CDN cache nodes and CDN origin or CDN cache nodes via dedicated optically transparent wavelength channels.

So far, no transparent optical CDN connection of the CDN caches has been possible.

Here, a transparent optical CDN cache connection is possible.

So far, no transparent optical full meshing of the CDN cache nodes has been possible.

Here, in the hierarchical levels (CDN origin and CDN cache level, CDN cache and CDN cache level), transparent optical full meshings between the corresponding nodes are possible.

So far, all CDN services have been guided via the same IP transport network, wherein the CDN traffics have had to share the IP transport network resources with further non-CDN services, which has led to service losses in case of high traffic volumes.

Here, the different CDN services can be guided via own dedicated CDN over OTN channels. Thus, the mutual dependency of the CDN services and also the dependency from the IP transport network and its non-CDN services are excluded. Moreover, the different CDN services can be individually managed and provided in accordance with their demands (capacity, time behavior, latency, losses, etc.).

So far, the logic CDN network structure has been a star structure.

Here, the logic CDN structure can be expanded to a full meshing in the network levels.

So far, independent transparent optical connections between the CDN nodes of different levels have not been possible.

Here, independent transparent optical connections between the CDN origin and CDN cache nodes can be provided in an optically transparent manner.

So far, no parallel and independent data deliveries between the nodes have been possible in the individual networks of the second level.

Here, parallel and independent data deliveries between dedicated nodes are possible in the individual areas of the second network levels.

So far, only a centralized network structure with a fixed star point has been possible.

Here, multiple centralized and independent network structures with selectable star points are possible in parallel. Also decentralized structures with multiple star points are possible, which can perform data deliveries in parallel independent of one another but in a commonly controlled and monitored manner.

So far, no parallel and independent distribution of content has been possible.

Here, prompt parallel distributions of content in up to two steps to all nodes of the CDN network are possible.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted its one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCES

[1] E. Nygren, R. K. Sitaraman, and J. Sun. The Akamai Network: A Platform for High-performance Internet Applications. SIGOPS Oper. Syst. Rev., 2010.
[2] Benjamin Frank, et all, "Pushing CDN-ISP Collaboration to the Limit", TU Berlin, bfrank@net.t-labs.tu-berlin.de; ACM SIGCOMM Computer Communication Review 35 Volume 43, Number 3, July 2013
[3] Cisco Visual Networking Index: Forecast and Methodology, 2012-2017, May 29, 2013
[4] http://www.streamzillacdn.com/streamzilla-network/
[5] Sandvine Report: http://www.sandvine.com/
[6] TorNet architecture; http://www.vde-verlag.de/proceedings-en/453437032.html
[7] DWDM 100 Gbit/s over 3000 km transmission; http://www.cisco.com/en/US/prod/collateral/optical/ps5724/ps2006/data_sheet_c78-713296.html
[8] DWDM 40 Gbit/s over 9000 km transmission; http://www.mitsubishielectric.com/company/rd/advance/pdf/vol139/139_TR2.pdf
[9] 96 channel DWDM system; http://www.cisco.com/en/US/prod/collateral/optical/ps5724/ps2006/data_sheet_c78-713296.html
[10] ITU-T, source Recommendation ITU-T G.694.1
[11] 40 Gbit/s over 11.000 km Submarine Cable unrepeated; http://www.submarinenetworks.com/systems/trans-pacific/tgn-pacific/40gbps-transmission-over-tgn

The invention claimed is:

1. A content delivery network (CDN), comprising:
at least one CDN origin node; and
multiple CDN cache nodes connected to the at least one CDN origin node via an optical transport network (OTN);
wherein deliveries and/or routing from the multiple CDN cache nodes to the at least one CDN origin node and/or vice versa is performed below layer 3 of the Open Systems Interconnection (OSI) model;
wherein the OTN represents a first CDN network level from the at least one CDN origin node to the multiple CDN cache nodes and the optical routing is performed via N×N array waveguide gratings (AWGs);
wherein full meshing is realized by dense wavelength division multiplex (DWDM) channels; and
wherein a second CDN network level is formed by CDN cache nodes which are connected via optical M×M AWG elements to the first CDN network level such that also in the second CDN network level a wavelength-addressed full meshing becomes possible for transparent optical connections between the at least one CDN origin and the CDN cache nodes.

2. The CDN according to a claim 1, wherein the OTN is a passive transparent optically routed transport network.

3. The CDN according to claim 2, wherein the OTN is in accordance with ITU-T standard G.709, such that a direct transparent optical connection (i) from a CDN cache node to a CDN origin node and vice versa, and/or (ii) from a CDN cache node to a different CDN cache node and vice versa is possible.

4. The CDN according to claim 1, wherein the multiple CDN cache nodes are connected to the at least one CDN origin node via a star topology.

5. The CDN according to claim 4, wherein the star topology is a meshed star topology.

6. The CDN according to claim 5, wherein the meshed star topology is a fully meshed star topology.

7. The CDN according to claim 1, wherein the delivery of data and/or the routing of the multiple CDN cache nodes to the at least one CDN origin node and vice versa is performed without an IP overlay network.

8. The CDN according to claim 1, wherein the N and M are selected from the group consisting of the following N, M combinations: [3,32]; [4,24]; [6,16]; [8,12]; [12,8]; [16,6]; [24,4] und [32,3].

9. The CDN according to claim 1, wherein the CDN is connected to a further CDN via the OTN so that interconnection traffic between the two CDNs is routed below layer 3 of the OSI model.

10. The CDN according to claim 9, wherein the interconnection traffic between the two CDNs is routed directly, passively and optically transparently.

11. The CDN according to claim 10, wherein the interconnection traffic between the two CDNs is routed bidirectionally.

12. The CDN according to claim 11, wherein the interconnection traffic is realized between CDN origin nodes of the two CDN networks and/or between different CDN origin and CDN cache nodes.

13. The CDN according to claim 1, wherein different CDN services are delivered and/or routed via different wavelength-addressed optical channels separately and independent of one another.

14. The CDN according to claim 13, wherein the different CDN services include CDN content traffic, CDN synchronization traffic, and/or CDN interconnection traffic.

15. A method for delivering and distributing digital contents via a content delivery network (CDN) comprising at least one CDN origin node and multiple CDN cache nodes which are connected to the CDN origin node via an optical transport network (OTN), the method comprising:

routing digital contents to be delivered from the least one CDN origin node to the multiple CDN cache nodes and vice versa below layer 3 of the Open Systems interconnection (OSI) model;

wherein the OTN represents a first CDN network level from the at least one CDN origin node to the multiple CDN cache nodes and the optical routing is performed via N×N array waveguide gratings (AWGs);

wherein full meshing is realized by dense wavelength division multiplex (DWDM) channels; and wherein a second CDN network level is formed by CDN cache nodes which are connected via optical M×M AWG elements to the first CDN network level such that also in the second CDN network level a wavelength-addressed full meshing becomes possible for transparent optical connections between the at least one CDN origin and the CDN cache nodes.

16. The method according to claim 15, wherein the routing is performed in a wavelength-addressed manner via an optically transparent network.

* * * * *